(12) United States Patent
Consolante (10) Patent No.: US 10,575,557 B2
(45) Date of Patent: Mar. 3, 2020

(54) METHOD FOR MANUFACTURING MULTI-COMPONENT AEROSOL FORMING ARTICLES

(71) Applicant: PHILIP MORRIS PRODUCTS S.A., Neuchatel (CH)

(72) Inventor: Antonio Consolante, Casalecchio di Reno (IT)

(73) Assignee: Philip Morris Products S.A., Neuchatel (CH)

( * ) Notice: Subject to any disclaimer, the term of this patent is extended or adjusted under 35 U.S.C. 154(b) by 61 days.

(21) Appl. No.: 15/745,741

(22) PCT Filed: Aug. 24, 2016

(86) PCT No.: PCT/EP2016/069944
§ 371 (c)(1),
(2) Date: Jan. 18, 2018

(87) PCT Pub. No.: WO2017/032784
PCT Pub. Date: Mar. 2, 2017

(65) Prior Publication Data
US 2018/0213842 A1 Aug. 2, 2018

(30) Foreign Application Priority Data
Aug. 24, 2015 (EP) .................................... 15182228

(51) Int. Cl.
*A24F 47/00* (2006.01)
*A24D 3/02* (2006.01)
(Continued)

(52) U.S. Cl.
CPC ............ *A24F 47/006* (2013.01); *A24B 15/12* (2013.01); *A24B 15/165* (2013.01); *A24C 5/478* (2013.01);
(Continued)

(58) Field of Classification Search
None
See application file for complete search history.

(56) References Cited

U.S. PATENT DOCUMENTS 4,238,994 A * 12/1980 Koch ...................... A24C 5/31
250/559.4
6,384,359 B1 * 5/2002 Belcastro ............. A24C 5/3412
131/905
(Continued)

FOREIGN PATENT DOCUMENTS

| WO | WO 2011/122971 | 10/2011 |
|---|---|---|
| WO | WO 2012/072265 | 6/2012 |
| WO | WO 2014/086999 | 6/2014 |

OTHER PUBLICATIONS

PCT Search Report and Written Opinion for PCT/EP2016/069944 dated Nov. 10, 2016 (9 pages).

*Primary Examiner* — Dennis R Cordray
(74) *Attorney, Agent, or Firm* — Mueting, Raasch & Gebhardt, P.A.

(57) ABSTRACT

The invention relates to a method for manufacturing multi-component aerosol forming articles, each aerosol forming article defining a longitudinal axis and comprising N components serially juxtaposed along the longitudinal axis, where N is an integer≥2, the method comprising: —providing transporting means for transporting components of aerosol forming articles in a transporting direction, said transporting means defining seats along said transporting direction; —supplying seats of said transporting means with a first component for each aerosol forming article by positioning said first components one after the other along the transporting direction with their longitudinal axis parallel one to the others; —checking each seat for the presence of said first component; —adjoining a second component to the
(Continued)

first component in a lengthwise axial manner in a given seat only if the first component is present in said given seat.

13 Claims, 5 Drawing Sheets

(51) Int. Cl.
| | |
|---|---|
| *A24B 15/16* | (2006.01) |
| *A24B 15/12* | (2006.01) |
| *A24C 5/52* | (2006.01) |
| *A24C 5/47* | (2006.01) |
| *B65G 41/00* | (2006.01) |
| *A24D 3/10* | (2006.01) |

(52) U.S. Cl.
CPC .............. *A24C 5/52* (2013.01); *A24D 3/0287* (2013.01); *A24D 3/0295* (2013.01); *B65G 41/00* (2013.01); *A24D 3/10* (2013.01)

(56) References Cited

U.S. PATENT DOCUMENTS

| | | | | |
|---|---|---|---|---|
| 2006/0207616 A1* | 9/2006 | Hapke | ................... | A24C 5/3412 |
| | | | | 131/280 |
| 2009/0194118 A1* | 8/2009 | Ademe | ................ | A24C 5/3412 |
| | | | | 131/346 |
| 2012/0077659 A1* | 3/2012 | Yanchev | .............. | A24D 3/0287 |
| | | | | 493/39 |
| 2013/0029821 A1* | 1/2013 | Hoffmann | ............ | A24D 3/0287 |
| | | | | 493/4 |
| 2015/0289566 A1* | 10/2015 | Carraro | ................ | A24D 3/0287 |
| | | | | 131/281 |

* cited by examiner

METHOD FOR MANUFACTURING MULTI-COMPONENT AEROSOL FORMING ARTICLES

This application is a U.S. National Stage Application of International Application No. PCT/EP2016/069944, filed Aug. 24, 2016, which was published in English on Mar. 2, 2017, as International Publication No. WO 2017/032784 A1. International Application No. PCT/EP2016/069944 claims priority to European Application No. 15182228.5 filed Aug. 24, 2015.

The present invention relates to a method for manufacturing multi-component aerosol forming articles.

Typically, an aerosol forming article comprises a plurality of components assembled in the form of a rod and including: a combustible heat source, an aerosol forming substrate, which may be located within, around or downstream of the combustible heat source, and a mouthpiece filter, located downstream of the aerosol forming substrate within the rod.

The aerosol forming substrate in an aerosol forming article is typically a processed substrate that contains an aerosol former such as glycerin. For example, the aerosol forming substrate included in an aerosol forming article may comprise a crimped or folded tobacco plug comprised of cast leaf or reconstituted tobacco. A flavour, such as menthol, may be loaded into the aerosol forming substrate. Alternatively, a flavour-generating component is added to the aerosol forming article to provide a flavour.

The provision of flavour, in the form of menthol capsules, heat sources and of additional elements, such as metal parts, requires the manufactures of multi-components aerosol-smoking articles.

Multi-component aerosol forming articles are known to be manufactured in a serial process in which each aerosol forming article is formed by serially juxtaposing all its components along a longitudinal axis defined by the aerosol forming article. At the end of the manufacturing process, a quality check takes place, during which the aerosol forming articles which do not comply with the required specifications are removed and discarded. However, this causes a waste of many relatively expensive components.

As such, it is an object of the present invention to provide a method for the manufacturing of multi-component aerosol forming articles that increases the efficiency of manufacturing the multi-component aerosol forming articles and the reduction of expensive waste.

The present invention relates to a method for manufacturing multi-component aerosol forming articles, each aerosol forming article defining a longitudinal axis and comprising N components serially juxtaposed along the longitudinal axis, where N is an integer≥2. The method comprises providing transporting means for transporting components of aerosol forming articles in a transporting direction, said transporting means defining seats along said transporting direction; supplying seats of said transporting means with a first component for each aerosol forming article by positioning said first components one after the other along the transporting direction with their longitudinal axis parallel one to the others; checking each seat for the presence of said first component; and adjoining a second component to the first component in a lengthwise axial manner in a given seat only if the first component is present in said given seat.

Providing such a method, advantageously, avoids very expensive semi-finished components of the multi-component aerosol forming articles to be rejected due to the final quality check. At the same time, the method of the invention allows to maintain the desired production specification of the final aerosol forming articles.

In the following, with the term "components" any element which may be included in an aerosol forming article is meant. Such elements are known in the art and not further detailed below. For example, such component might include a plug of a filter, a heat source, a menthol capsule, a charcoal element, and so on.

Each component defines a longitudinal axis. Generally, but not necessarily, the components might be rod shaped.

In the following, the term "rod" denotes a generally cylindrical element of substantially cylindrical, oval or elliptical cross-section, comprising two or more components of an aerosol forming article.

Aerosol forming articles according to the present invention may be in the form of filter cigarettes or other smoking articles in which tobacco material is combusted to form smoke. The present invention additionally encompasses articles in which tobacco material is heated to form an aerosol, rather than combusted, and articles in which a nicotine-containing aerosol is generated from a tobacco material, tobacco extract, or other nicotine source, without combustion or heating. These articles in which aerosol is formed without combustion or where smoke is produced by combustion are in general called "aerosol-forming articles". Aerosol forming articles according to the invention may be whole, assembled aerosol forming articles or components of aerosol forming articles that are combined with one or more other components in order to provide an assembled article for producing an aerosol, such as for example, the consumable part of a heated smoking device.

As used herein, aerosol forming article is any article that generates an inhalable aerosol when an aerosol forming substrate is heated. The term includes articles that comprise an aerosol forming substrate that is heated by and external heat source, such as an electric heating element. An aerosol forming article may be a non-combustible aerosol forming article, which is an article that releases volatile compounds without the combustion of the aerosol-forming substrate. An aerosol forming article may be a heated aerosol forming article, which is an aerosol forming article comprising an aerosol forming substrate that is intended to be heated rather than combusted in order to release volatile compounds that can form an aerosol. The term includes articles that comprise an aerosol forming substrate and an integral heat source, for example a combustible heat source.

An aerosol forming article may be an article that generates an aerosol that is directly inhalable into a user's lungs through the user's mouth. An aerosol forming article may resemble a conventional smoking article, such as a cigarette and may comprise tobacco. An aerosol forming article may be disposable. An aerosol forming article may alternatively be partially-reusable and comprise a replenisheable or replaceable aerosol forming substrate.

An aerosol forming article may also include a combustible cigarette.

In preferred embodiments, the aerosol forming-article may be substantially cylindrical in shape. The aerosol forming article may be substantially elongated. The aerosol forming article may have a length and a circumference substantially perpendicular to the length. The aerosol forming article may have a total length between approximately 30 mm and approximately 100 mm. The aerosol forming article may have an external diameter between approximately 5 mm and approximately 12 mm.

According to the invention, the aerosol forming article includes at least two components, a first and a second component. The first of these components is initially transported alone in transporting means and thereafter the second component is added. The first and the second components are received and transported in a plurality of seats formed in the transporting means, where they are combined together in order to form the final multi-component article. Each seat of the transporting means is checked for the presence of the first component, and according to a step of the method of the invention the second component is adjoined to the first component in a lengthwise axial manner in a given seat only if the first component is present in that given seat.

The check is performed preferably while the first or second component is transported, that is, while the transporting means are moving in the transporting direction. The check preferably takes place at a given position, along the transporting direction of the transport means, where a detector is placed which checks the presence or absence of components preferably in all seats of the transporting means. Only if the check is positive, that is, only if the first component is present within the checked seat of the transporting means, the second component is adjoined. The adjoining of the second element is performed in a lengthwise manner, so that the first and the second components are positioned one after the other substantially according to a common longitudinal axis.

The addition of the second component is performed only in those seats which are occupied by the first component. Preferably, in the transporting direction, downstream of the position in which the second component is added, the transporting means include in each seat where the first component was present two components, the first and the second. A plurality of parallel first and second components are thus transported along the transporting direction downstream of the checking position.

Gaps can be present in the transporting means, that is, empty seats, where the first component was missing, are possible. In these seats, also the second component is missing, leaving the seat empty. The lack of addition of a second component when the first component is missing allows to minimize the wasted products. The lack of supply of the second component in the seats where the first component is missing allows to spare such second component in a position where there is already a deficiency—that is the lack of the first component. Moreover, no stoppage of the transporting means is needed and the production can continue at high speed also when an empty seat is present within the transporting means.

The transporting means may comprise a flat drum having a plurality of seats. In alternative to the flat drum, a series of flat drums can be used. Preferably, the seats are equally spaced.

In order to supply each seat of the transporting means with the first and second components, preferably additional respective drums—called supplying drums—are provided, more preferably also each defining seats along the transporting direction of the transporting means. Preferably, the seats are equally spaced.

Preferably a first supplying drum for supplying the first component and a second supplying drum for supplying the second components to the transporting means are provided. Preferably, two second supplying drums are present, each at an opposite side of the first supplying drum, so that for each first component two second components are added in a seat if in that seat a first component is present. The first supplying drum is located above the transporting means, such as the flat drum, preferably in a central position with respect to the transporting means. The second supplying drum is provided downstream of the first drum and is located above the transporting means on both sides of the transporting means.

Preferably, the method of the invention further comprises checking each seat for the presence of said second component; and adjoining a third component to the second component in a lengthwise axial manner in a given seat only if the first component and the second component are present in said given seat.

The method of the invention is scalable in an easy manner regardless of the number of components forming the aerosol forming article. Any number of components can be handled by the present method, adding a further check in order to determine whether the previous component is present or not in a specific seat of the transporting means.

For example, in order to adjoin each seat of the transporting means with the third components, a third supplying drum is provided. Preferably, two third supplying drums are present, each for a different side of the transporting means, and more preferably each defining equally spaced seats along the transporting direction of the transporting means.

Preferably, the third drums are provided downstream of the second drums and are located above the transporting means on both sides of the transporting means.

It is to be understood that the number of drums for supplying the components of the multi-component aerosol forming article can be varied based on the type of aerosol forming article to be manufactured.

Preferably, N is 3 or more. For example, N may be 4 or more or 5 or more. N may be between 2 and 10 or between 3 and 6.

The method of the invention may further comprise checking each seat for the presence of a $(N-1)$th component; and adjoining a Nth component to the $(N-1)$th component in a lengthwise axial manner in a given seat only if all components from the first component to the $(N-1)$th component are present in said given seat.

The multi component aerosol forming article includes N components all disposed in an axially juxtaposed manner. In order to obtain this configuration, according to a specific embodiment of the invention, the components are added one by one to the first component, which is transported first.

According to the invention, in a given seat, the Nth component is added only if the $(N-1)$th is present in such a seat. Any number of component N is handled according to the method of the invention adding a component supplying device to supply the Nth component to the $(N-1)$ already present components. For N components, $N-1$ checks are performed, so that the Nth component is supplied only if all the $N-1$ components are already present in a given seat. Preferably, If at least one of the $N-1$ component is missing, none of the following components is not added and thus the waste is minimized.

In order to check each seat for the presence of the first and second components, detection means are preferably provided. For example detection means are positioned downstream of each supplying drum. In a preferred embodiment, the detection means comprises a vision system, such as a camera or a photo sensor, such as a laser photo sensor.

More preferably, the method comprises the step of recovering the Nth component from a given seat if any of the components from the first component to the $(N-1)$th component is missing from the given seat. The already placed components in the seat are not going to become a final product in case one of the components is not present. For this reason, it is preferred to recover the already placed components in the seat, so as to reduce waste and costs.

In order to carry out the recovering step, ejection seats are preferably provided in the transporting means. With the term "ejection seats" seats are meant at which means for ejecting the already placed components are provided. Preferably, the ejection means comprise an air puff.

Preferably, one of the component, in particular the Nth component, of the multi-component aerosol forming article comprises an aerosol forming article comprising in turn a tobacco-containing material including volatile tobacco flavour compounds, which are released from the substrate upon heating. The aerosol forming substrate may comprise, for example, one or more of: powder, granules, pellets, shreds, spaghettis, strips or sheets containing one or more of: herb leaf, fragments of tobacco ribs, reconstituted tobacco, homogenised tobacco, extruded tobacco and expanded tobacco.

Preferably, one of the component, in particular the first component of the multi-component aerosol forming article is a segment of a filter of an aerosol forming article.

The filter may be a cellulose acetate filter plug. The filter may be approximately 7 mm in length in one embodiment, but may have a length of between approximately 5 mm and approximately 10 mm. The tobacco component might be a tobacco cut filler or an aerosol generating reconstituted tobacco.

Alternatively, one of the components comprises a tobacco rod to be combusted.

Other components of the multi-component aerosol forming article may include a heat source, a volatile flavour generating component, for example a menthol capsule, a charcoal element, and so on. A heat source comprises a combustible high carbon content carbonaceous material and also can include graphite or alumina. The heat source is for example a charcoal element that may be ignited and transfer heat to the aerosol-forming substrate to form an inhalable aerosol.

A volatile flavour generating component may be coupled to a fibrous support element. The fibrous support element may be any suitable substrate or support for locating, holding, or retaining the flavour generating component. The fibrous support element may be, for example, a paper support or a capsule. The fibrous support may be, for example, a thread or twine. Such thread or twine may be saturated in a liquid component, such as liquid menthol. Alternatively, such a thread or twine may be threaded to or otherwise coupled to a solid flavour generating component. For example, solid particles of menthol may be coupled to a thread.

Preferably, the method comprises preparing two articles comprising N components by dividing in two a doubled article comprising 2N−1 components in the middle of the central component. The central component is preferably a double length first component. The method preferably comprises adjoining 2N−1 component in a lengthwise axial manner in each seat. More preferably, the method comprises adjoining a Nth component to each (N−1)th component at both sides of the first component in a lengthwise axial manner in a given seat only if all components from the first component to the (N−1)th component are present in said given seat.

In each seat a double aerosol forming article is realized. To each axial side of the first component, a second component is added, resulting for each seat in a first component sandwiched between two second components. In the same way, two Nth components are added to the free side of two (N−1)th components. Only the first component is in contact to or adjacent to two second components, while the other components are in contact with the (N−1)th and the (N+1)th components. The structure of the so formed doubled aerosol forming article is preferably symmetric with respect to its center. The centre of symmetry of the doubled aerosol forming article is typically the center of the first component.

Preferably, the method comprises, at the step of adding the Nth components in a seat, the step of recovering any of the (N−1)th components in the same seat if any of the 2N−3 components is missing in the same seat.

Preferably, the method further comprises compressing all components along the longitudinal axis present in each seat. In this way, the components are tightly packed and ready for the subsequent processing phase.

Preferably, the method further comprises wrapping at least some of said components with paper. The wrapping can be performed according to any technique known in the art.

Preferably, the method further comprises cutting said first component in two.

The invention will be further described, by way of example only, with reference to the accompanying drawings in which.

Figure 1:
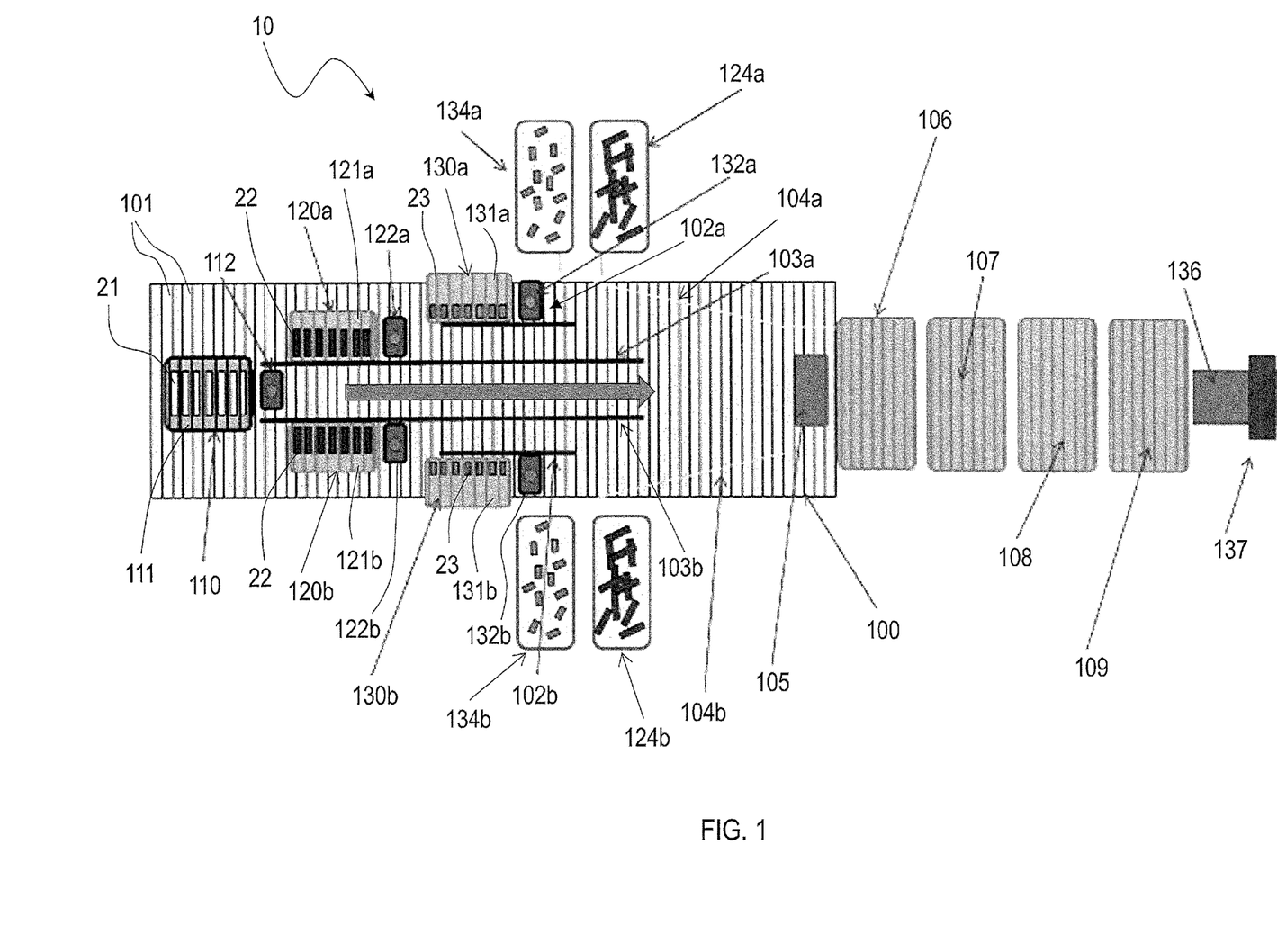
FIG. 1 is a schematic top view of the apparatus for carrying out the method for manufacturing multi-component aerosol forming articles according to the present invention.
Figure 2:
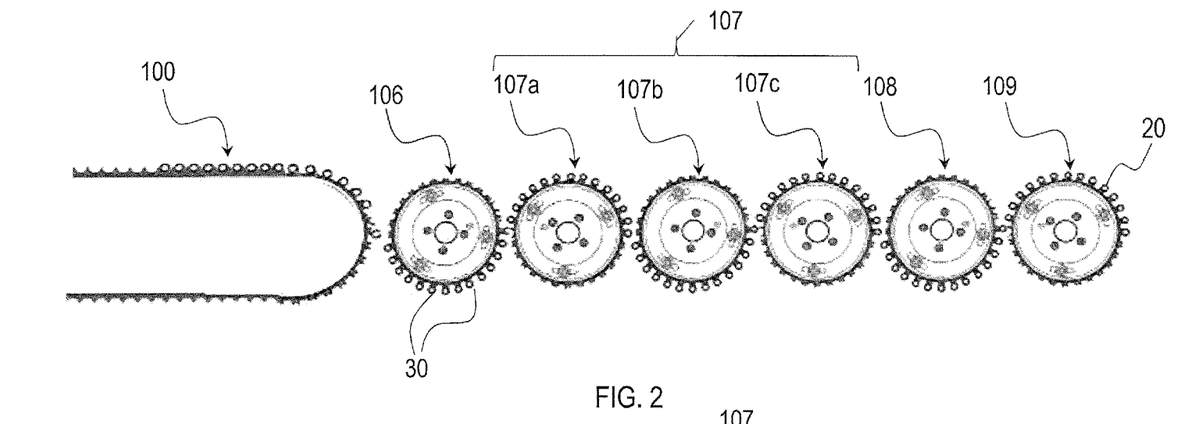
FIG. 2 is a partial schematic side view of the apparatus of FIG. 1.
Figure 3:
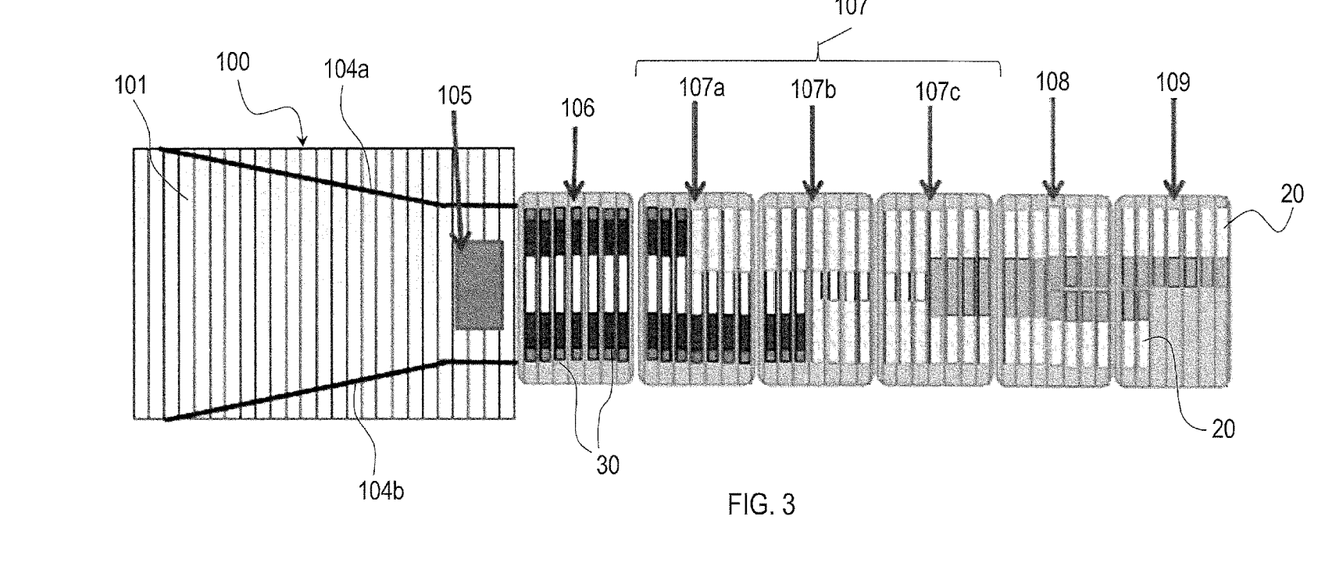
FIG. 3 is a schematic top view of FIG. 2, showing the wrapping, cutting and turning phases of the method for manufacturing multi-component aerosol forming articles according to the invention.

With reference to FIGS. 1 to 3, the apparatus 10 utilised to manufacture multi-component aerosol forming articles 20 is arranged as follows.

A flat drum 100 is provided for receiving a plurality of components of multi-component aerosol forming articles 20 and for transporting the components in a transporting direction of the apparatus 10 (the transporting direction is indicated with an arrow in FIG. 1).

A plurality of seats 101 are formed in the flat drum 100, which are equally spaced along the transporting direction. Each seat 101 is adapted to accommodate the components of two multi-component aerosol forming articles 20, therefore its length is adapted accordingly.

As shown in FIG. 1, the apparatus 10 further comprises a first supplying drum 110 provided above the flat drum 100 in a central position with respect to the flat drum 100.

The first supplying drum 110 moves along the same travel direction of the flat drum 100 and comprises a plurality of seats 111, which are equally spaced along the transporting direction of the apparatus 10 and adapted to accommodate first components 21 of the multi-component aerosol forming articles 20.

The first supplying drum 110 is driven by a motor to supply a central portion of each seat 101 of the flat drum 100 with a first component 21 of the multi-component aerosol forming articles 20.

In the embodiment illustrated, the first component consists of a 2-up mouthpiece filter plug 21 formed from cellulose acetate.

It is to be understood that referenced to a 2-plug mouthpiece filter plug 21 refers to a plug construction such that, if it were divided into two pieces, would render a pair of mouthpiece filters 21.

A first detector 112 is provided downstream of the first supplying drum 110 to check each seat 101 of the flat drum 100 for the presence of the 2-plug mouthpiece filter plug 21.

Terms "downstream" and "upstream" are used to describe a relative position of elements or components of the apparatus to manufacture multi-component aerosol forming articles along the transporting direction of the apparatus.

Downstream of the first supplying drum 110, the apparatus 10 further comprises a pair of opposite second supplying drums 120a, 120b. The second supplying drums 120a, 120b are provided above the flat drum 100 on both sides of the flat drum 100. Each second supplying drum 120a, 120b comprises a plurality of seats 121a, 121b, which are equally spaced along the transporting direction of the apparatus 10 and adapted to accommodate respective second components 22 of the multi-component aerosol forming articles 20.

The second supplying drums 120a, 120b are driven by a respective motor to supply a seat 101 of the flat drum 100 with second components 22 of the multi-component aerosol forming articles 20. More specifically, the second components 22 of the multi-component aerosol forming articles 20 are accommodated in each seat 101 of the flat drum 100 on both sides of the first component 21.

In the embodiment illustrated, the second component consists of an aerosol forming substrate 22. The aerosol forming substrate 22 comprises for example a bundle of crimped cast-leaf tobacco wrapped in a filter paper. The cast-leaf tobacco includes additives, comprising glycerin as an aerosol-forming additive.

A second detector 122a, 122b is provided downstream of a respective second supplying drum 120a, 120b to check each seat 101 of the flat drum 100 for the presence of the aerosol forming substrates 22.

A pair of opposite third supplying drums 130a, 130b are provided downstream of the second supplying drums 120a, 120b. The third supplying drums 130a, 130b are provided above the flat drum 100 on both sides of the flat drum 100. Each third supplying drum 130a, 130b comprises a plurality of seats 131a, 131b which are equally spaced along the transporting direction of the apparatus 10 and adapted to accommodate respective third components 23 of the multi-component aerosol forming articles 20.

The third supplying drums 130a, 130b are driven by a respective motor to supply a seat 101 of the flat drum 100 with third components 23 of the multi-component aerosol forming articles 20. More specifically, the third components 23 of the multi-component aerosol forming articles 20 are accommodated in each seat 101 of the flat drum 100 adjacent to a respective second component 22 of the multi-component aerosol forming articles 20.

In the embodiment illustrated, the third component consists of a combustible heat source 23. A preferred combustible heat source comprises a combustible high carbon content carbonaceous material and also can include graphite or alumina. The combustible heat source 23 is for example a charcoal element that may be ignited and transfer heat to the aerosol-forming substrate 22 to form an inhalable aerosol.

A third detector 132a, 132b is provided downstream of a respective third supplying drum 130a, 130b to check each seat 111 of the flat drum 100 for the presence of the combustible heat sources 23.

Ejection seats 102a, 102b are provided in the flat drum 100, downstream of the respective third detector 132a, 132b, to accommodate a combustible heat source 23 to be ejected and recovered in the event the third detector 132a or 132b detects that the other combustible heat source 23 is missed from the seat 101 of the flat drum 100. The combustible heat source 23 is thus ejected from the apparatus 10 by using an air puff. The ejected combustible heat source 23 is recovered in boxes 134a, 134b for being re-used. The boxes 134a, 134b are provided at a respective ejection seat 102a, 102b of the flat drum 100.

Further ejection seats 103a, 103b are provided in the flat drum 100, downstream of the combustible heat source ejection seats 102a, 102b, to accommodate an aerosol forming substrate 22 to be ejected and recovered in the event the second detector 122a or 122b detects that the other aerosol forming substrate 22 is missed from the seat 101 of the flat drum 100.

Moreover, the further ejection seats 103a, 103b accommodate both the aerosol forming substrates 22 to be ejected and recovered in the event one or both the third detectors 132a or 132b detect that the one or both the combustible heat sources 23 are missed from the seat 101 of the flat drum 100. The aerosol forming substrates 22 are thus ejected from the apparatus 10 by means of an air puff. The ejected forming substrates 22 are then recovered in boxes 124a, 124b for being re-used. The boxes 124a, 124b are provided at a respective ejection seat 103a, 103b of the flat drum 100.

The apparatus 10 further comprises compressing guides 104a, 104b provided downstream of the further ejection seats 103a, 103b and configured to compress the components 21, 22, 23 of the multi-component aerosol forming articles 20 according to a compression direction normal to the transporting direction of the flat drum 100. The compressed components 21, 22, 23 of the multi-component aerosol forming articles 20 are thus axially aligned within the seats 101 in an end-to-end relationship, abutting one another without any barrier therebetween. Rods 30 are thus obtained. A gap detector 105 is also provided downstream of the compressing guides 104a, 104b to check if gaps are present between the components 21, 22, 23.

The apparatus 10 further comprises a transfer drum 106 provided to transfer the assembled components 21, 22, 23 of the multi-component aerosol forming article to a wrapping station 106 configured to provide the rods 30 with an outer wrap, for example paper.

With reference in particular to FIGS. 2 and 3, the wrapping station 107 comprises three wrapping drums 107a, 107b, 107c. More specifically, the first wrapping drum 107a is configured to wrap an upper portion of the rods 30, the second wrapping drum 107b is configured to wrap a lower portion of the rods 30 and the third wrapping drum 107c is configured to wrap a central portion of the rods 30.

Downstream of the wrapping station 107, the apparatus 10 further comprises a cutting drum 108 configured to cut the rods 30 in the middle of the 2-plug mouthpiece filter 21, thus obtaining two aerosol forming articles 20, each comprising a mouthpiece filter 21, an aerosol forming substrate 22 and a combustible heat source 23.

With reference back to FIG. 1, downstream of the cutting drum 108, the apparatus 10 also comprises a turning drum 109, a packing device 136 and a pick-up device 137. These devices are known in the art, therefore they are not described in detain herein.

Figure 4:
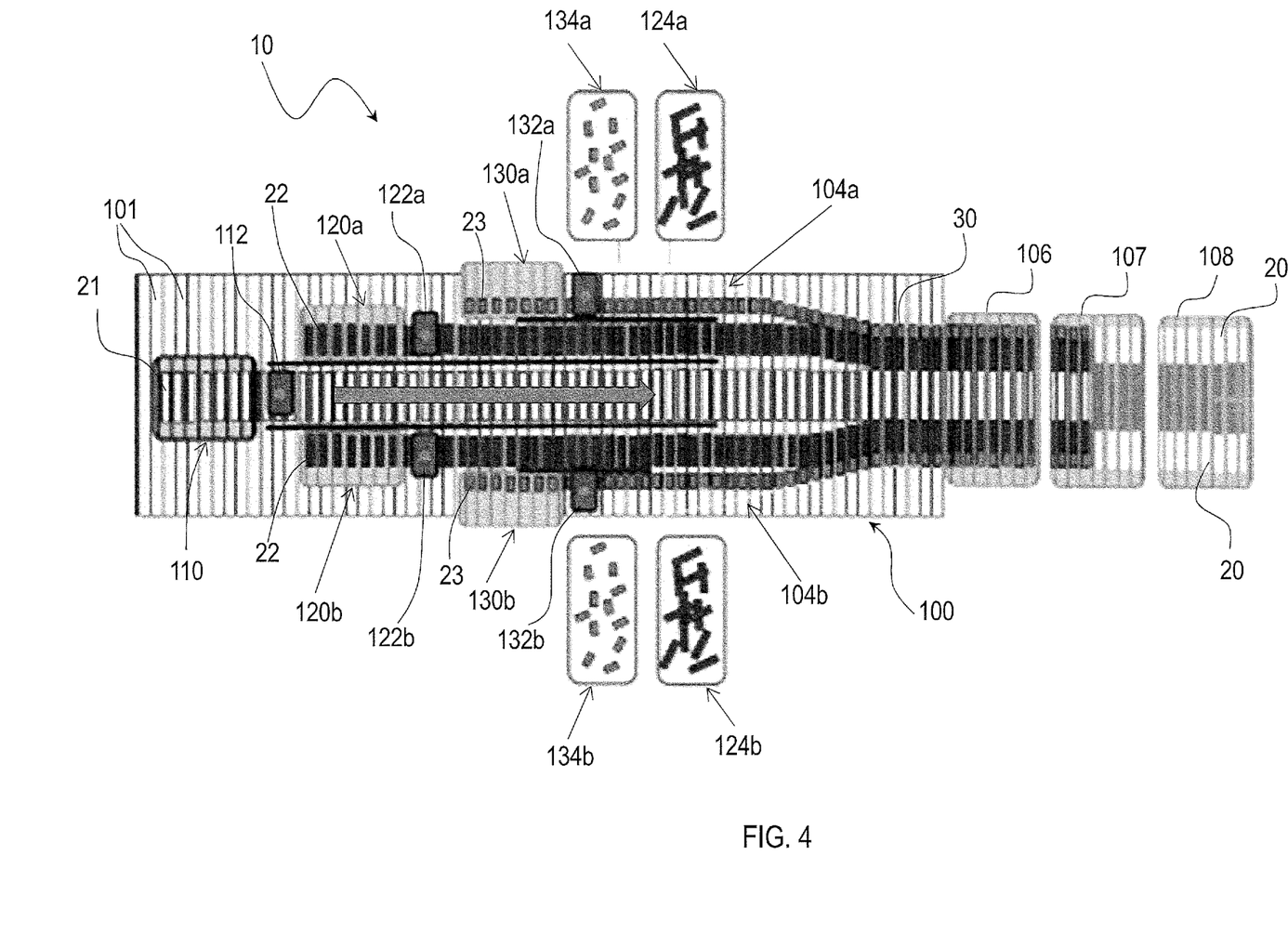
FIG. 4 shows a schematic diagram of phases of the method for manufacturing multi-component aerosol forming articles according to the invention, in a normal manufacturing condition, where all components of the multi-component aerosol forming articles are supplied to their respective seat.

With reference to FIG. 4, the different steps of the manufacturing method according to the invention are illustrated in a normal manufacturing situation, where all components 21, 22, 23 of the aerosol forming articles 20 are correctly placed in the seats 101 of the flat drum 100 of the apparatus 10.

More specifically, the method start by supplying a 2-plug mouthpiece filter 21 from the first supplying drum 110 to the central portion of a seat 101.

In a following step of the method, the first detector 112 detects that the 2-plug mouthpiece filter 21 is present within the seat 101 and a pair of aerosol forming substrates 22 are supplied from the second supplying drums 120a, 120b to both sides of the 2-plug mouthpiece filter 21.

In a following step, the second detectors 122a, 122b detect that both the aerosol forming substrates 22 are present within the seat 101 and a pair of combustible heat sources 23 are supplied from the third supplying drums 130a, 130b within the seat 101 of the flat drum 100, each adjacent to a respective aerosol forming substrate 22.

In a following step of the method, the 2-plug mouthpiece filter 21, the pair of aerosol forming substrates 22 and the pair of combustible heat sources 23 are compressed by the compressing guides 104a, 104b thereby being axially aligned within the seat 101 in an end-to-end relationship, abutting one another without any barrier therebetween. A plurality of rods 30 are thus obtained.

In a following step of the method, the gap detector 105 checks if gaps are present in the rods 30.

In a following step of the method, the plurality of rods 30 are subsequently transferred from the flat drum 100 to the wrapping station 107 by means of the transferring drum 106. In the wrapping station 107, the three wrapping drums 107a, 107b, 107c provide each rod 30 with an outer wrap.

In a following step of the method, each wrapped rod 30 is cut by the cutting drum 108 at the middle of the 2-plug mouthpiece filters 21, thus obtaining a pair of multi-component aerosol forming articles 20.

Figure 5:
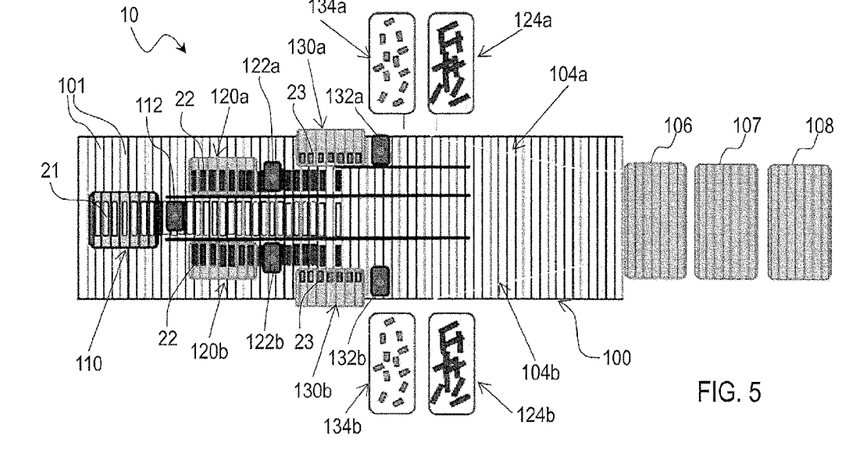
FIGS. 5, 6 and 7a-7b show schematic diagrams of phases of the method of manufacturing multi-component aerosol forming articles according to invention, in anomalous manufacturing conditions, where a component of a multi-component aerosol forming article is not supplied to the seat.

With reference to FIG. 5 the different steps of the manufacturing method according to the invention are illustrated in a first anomalous manufacturing situation, where the 2-up mouthpiece filter 21 of the multi-component aerosol forming article 20 is not placed in the seat 101 of the flat drum 100 of the apparatus 10.

In this case, the first detector 112 detects that the 2-up mouthpiece filter 21 is not present in the seat 101 of the flat drum 100.

As a consequence, in the following steps of the method, the second 120a, 120b and third supplying drums 130a, 13b do not supply respectively the pair of aerosol forming substrates 22 and combustion heat sources 23 within the seat 101.

Figure 6:
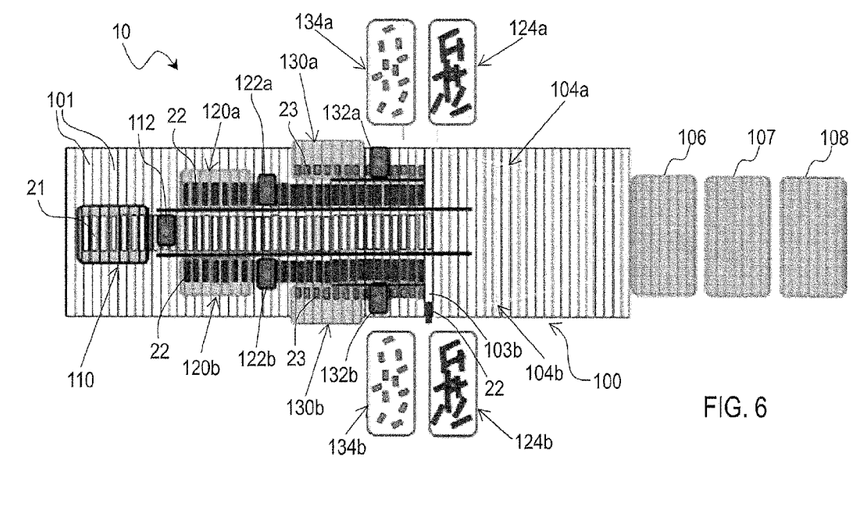

In FIG. 6 the different steps of the manufacturing method according to the invention are illustrated in a further anomalous manufacturing situation, where one of the aerosol forming substrates 22 is not placed in the seat 101 of the flat drum 100 of the apparatus 10.

In this case, the second detector 122a detects that the aerosol forming substrate 22 is not present within the seat 101, whereas the second detector 122b detects that the aerosol forming substrate 22 is present within the seat 101.

In a following step of the method, the third supplying drums 130a, 13b do not supply the pair of combustion heat sources 23 within the seat 101.

In a following step of the method, the aerosol forming substrate 22 within the seat 101 is ejected at the ejection seat 103b through an air puff and recovered within the box 124b to be reused.

The 2-up mouthpiece filter(s) 21 is(are) ejected from the transferring drum 106 and wasted. In a preferred embodiment the 2-up mouthpiece filter(s) 21 is(are) preferably recovered within a box not shown in the Figures similar to boxes 124a and 124b to be reused.

Figure 7A:
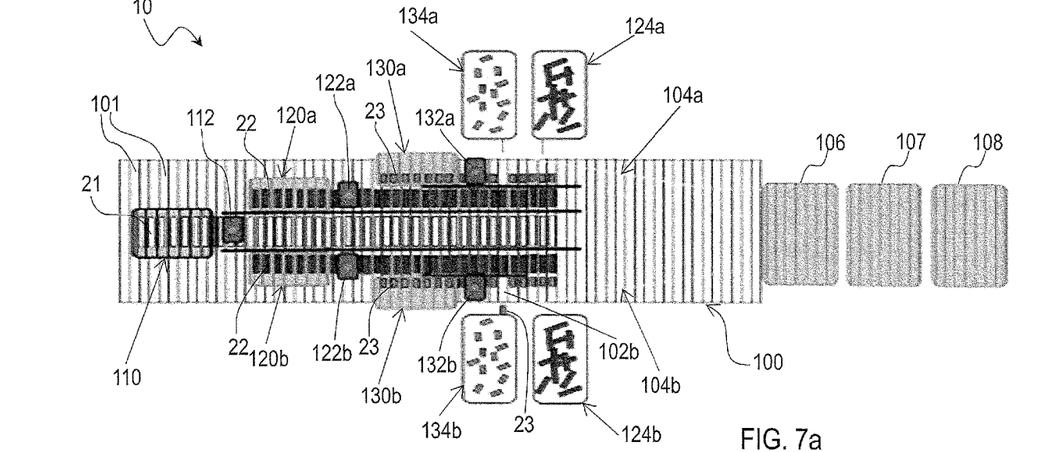
Figure 7B:
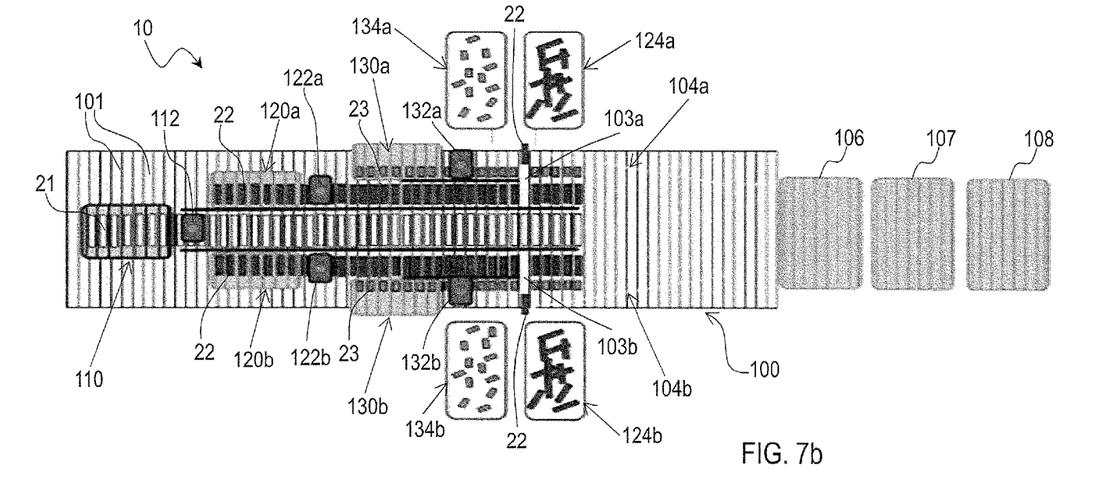

In FIGS. 7a and 7b the different steps of the manufacturing method according to the invention are illustrated in a further anomalous manufacturing situation, where one of the combustion heat sources 23 is not placed in the seat 101 of the flat drum 100 of the apparatus 10.

In this case, the third detector 132a detects that the combustion heat sources 23 is not present within the seat 101, whereas the third detector 132b detects that the combustion heat sources 23 is present within the seat 111.

In a following step of the method, the combustion heat sources 23 within the seat 101 is ejected at the ejection seat 102b through an air puff and recovered within the box 134b to be reused.

In a following step of the method, the aerosol forming substrates 22 within the seat 101 are ejected at the ejection seats 103a, 103b through an air puff and recovered within the boxes 124a, 124b to be re-used.

Also in this situation, the 2-up mouthpiece filter 21 is ejected from the transferring drum 106 and wasted. In a preferred embodiment the 2-up mouthpiece filter 21 is preferably recovered within a box—not shown in the Figures—similar to boxes 124a and 124b to be reused.

The embodiments and examples described above illustrate but do not limit the invention. Other embodiments of the invention may be made without departing from the spirit and scope thereof, and it is to be understood that the specific embodiments described herein are not limiting.

The invention claimed is:

1. A method for manufacturing multi-component aerosol forming articles, each aerosol forming article defining an aerosol longitudinal axis and comprising N components serially juxtaposed along the aerosol longitudinal axis, where N is an integer≥2 and each component comprising a component longitudinal axis, the method comprising:
   providing transporting seats for transporting components of aerosol forming articles in a transporting direction, said transporting seats defining seats along said transporting direction;
   supplying seats of said transporting seats with a first component for each aerosol forming article by positioning said first components one after the other along the transporting direction with their component longitudinal axis parallel one to the others;
   checking each seat for the presence of said first component;
   adjoining a second component to the first component in a lengthwise axial manner in a given seat only if the first component is present in said given seat.

2. The method according to claim 1, comprising:
   checking each seat for the presence of said second component;
   adjoining a third component to the second component in a lengthwise axial manner in a given seat only if the first component and the second component are present in said given seat.

3. The method according to claim 1, comprising:
   checking each seat for the presence of a (N−1)th component;

adjoining a Nth component to the (N−1)th component in a lengthwise axial manner in a given seat only if all components from the first component to the (N−1)th component are present in said given seat.

4. The method according to claim 3, comprising:
recovering the Nth component from a given seat if any of the components from the first component to the (N−1)th component is missing from said given seat.

5. The method according to claim 1, wherein said Nth component comprises tobacco.

6. The method according to claim 1, wherein said first component is a segment of a filter of an aerosol forming article.

7. The method according to claim 1, comprising:
adding a second component to each axial side of the first component and adjoining a Nth component to each (N−1)th component to both sides of each first component in a lengthwise axial manner in a given seat only if all components from the first component to each (N−1)th component are present in said given seat.

8. The method according to claim 1, wherein said first component is a double length first component.

9. The method according to claim 1, comprising:
adjoining 2N−1 components in a lengthwise axial manner in each seat.

10. The method according to claim 1, comprising:
compressing all components along the aerosol longitudinal axis present in each seat.

11. The method according to claim 1, comprising:
wrapping at least some of said components with paper.

12. The method according to claim 1, comprising:
cutting said first component in two.

13. The method according to claim 1, wherein the seats are equally spaced.

* * * * *